(12) United States Patent
Takeuchi et al.

(10) Patent No.: US 11,451,056 B2
(45) Date of Patent: Sep. 20, 2022

(54) PROCESSING APPARATUS, PROCESSING METHOD, AND PROGRAM FOR INFERRING DEMAND RESPONSE

(71) Applicant: NEC CORPORATION, Tokyo (JP)

(72) Inventors: Hiroki Takeuchi, Tokyo (JP); Hidekazu Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/964,311

(22) PCT Filed: Oct. 12, 2018

(86) PCT No.: PCT/JP2018/038062
§ 371 (c)(1),
(2) Date: Jul. 23, 2020

(87) PCT Pub. No.: WO2019/150662
PCT Pub. Date: Aug. 8, 2019

(65) Prior Publication Data
US 2021/0044112 A1  Feb. 11, 2021

(30) Foreign Application Priority Data

Jan. 31, 2018 (JP) .............................. JP2018-014834

(51) Int. Cl.
*G05B 19/042* (2006.01)
*H02J 3/14* (2006.01)
*H02J 3/00* (2006.01)

(52) U.S. Cl.
CPC .............. *H02J 3/14* (2013.01); *G05B 19/042* (2013.01); *H02J 3/003* (2020.01); *G05B 2219/2639* (2013.01)

(58) Field of Classification Search
CPC .......... H02J 3/14; H02J 3/003; H02J 2310/54; H02J 2310/14; H02J 2310/60;
(Continued)

(56) References Cited

U.S. PATENT DOCUMENTS 7,747,357 B2 * 6/2010 Murdoch .................. H02J 3/00
700/295
8,744,638 B2 * 6/2014 Tyagi ...................... H02J 3/144
700/295
(Continued)

FOREIGN PATENT DOCUMENTS

EP    2858197 A1    4/2015
EP    3176899 A1    6/2017
(Continued)

OTHER PUBLICATIONS

Extended European Search Report for EP Application No. EP18903396.2 dated on Feb. 22, 2021.
(Continued)

*Primary Examiner* — Darrin D Dunn
(74) *Attorney, Agent, or Firm* — Sughrue Mion, PLLC

(57) ABSTRACT

The present invention provides a processing apparatus (10) including: an acquiring unit (11) which acquires an adjustment request specifying a control time period and a control amount for controlling power demand; a determining unit (12) which, on the basis of the adjustment request, determines a first consumer whose power demand is to be controlled, and a control amount of the first consumer and a time period during which power demand of the first consumer is controlled; and an inference unit (13) which infers whether, if power demand of the first consumer were controlled in accordance with a determination result made by the determining unit (12), power demand of the first consumer before and/or after control would change from power demand of the first consumer if the power demand were not controlled.

12 Claims, 11 Drawing Sheets

(58) Field of Classification Search
CPC .. H02J 2203/20; H02J 3/144; H02J 13/00004; G05B 19/042; G05B 2219/2639; Y04S 20/00; Y04S 20/242; Y04S 20/222; Y04S 20/20; Y02B 90/20; Y02B 70/30; Y02B 70/3225
See application file for complete search history.

(56) References Cited

U.S. PATENT DOCUMENTS

| | | | | |
|---|---|---|---|---|
| 9,461,470 | B2* | 10/2016 | Cox | H02J 3/14 |
| 2012/0310431 | A1* | 12/2012 | Cheetham | G06Q 10/063 |
| | | | | 700/295 |
| 2013/0254151 | A1* | 9/2013 | Mohagheghi | G06Q 30/0621 |
| | | | | 706/46 |
| 2014/0277769 | A1* | 9/2014 | Matsuoka | F24F 11/30 |
| | | | | 700/278 |
| 2016/0086199 | A1* | 3/2016 | Edmonds | G06Q 10/04 |
| | | | | 705/7.31 |
| 2016/0099567 | A1 | 4/2016 | Sun et al. | |

FOREIGN PATENT DOCUMENTS

| | | |
|---|---|---|
| JP | 2002-165364 A | 6/2002 |
| JP | 2014-236605 A | 12/2014 |
| JP | 2016-116283 A | 6/2016 |
| JP | 2017-41971 A | 2/2017 |

OTHER PUBLICATIONS

International Search Report for PCT/JP2018/038062 dated Nov. 20, 2018 (PCT/ISA/210).

* cited by examiner

FIG. 5

| CONSUMER ID | RESOURCE UTILIZATION CONDITION ||||
| | RESOURCE UTILIZATION PERIOD | RESOURCE UTILIZATION TIME PERIOD | SUPPRESSED POWER UPPER LIMIT | ... |
|---|---|---|---|---|
| A00001 | FROM MARCH TO JUNE<br>FROM SEPTEMBER TO NOVEMBER | 9:00 ~ 17:00 | XX W | ... |
| ......... | ......... | ......... | ......... | ......... |

FIG. 6

| CONSUMER ID | ELECTRIC EQUIPMENT |
|---|---|
| A00001 | PH-001 (AIR CONDITIONER, COMPANY A), MR300 (REFRIGERATOR, COMPANY H) . . . |
| ⋮ | ⋮ |

US 11,451,056 B2

PROCESSING APPARATUS, PROCESSING METHOD, AND PROGRAM FOR INFERRING DEMAND RESPONSE

CROSS REFERENCE TO RELATED APPLICATIONS

This application is a National Stage of International Application No. PCT/JP2018/038062 filed Oct. 12, 2018, claiming priority based on Japanese Patent Application No. 2018-014834, filed Jan. 31, 2018, the disclosure of which is incorporated herein in its entirety by reference.

TECHNICAL FIELD

The present invention relates to a processing apparatus, a processing method, and a program.

BACKGROUND ART

PTL 1 discloses that an aggregator has a plurality of consumers share and bear power demand suppression notified from an electric power company.

CITATION LIST

Patent Literature

[PTL 1] Japanese Patent Application Publication No. 2017-41971

SUMMARY OF INVENTION

Technical Problem

Because of power demand control, power demand during time periods before and after the control may change. The change may affect adjustment of supply-demand balance in a power system. A problem to be solved by the present invention is to provide a technique contributing to adjustment of supply-demand balance in a power system.

Solution to Problem

According to the present invention, a processing apparatus is provided that includes an acquiring unit that acquires an adjustment request specifying a control time period during which power demand is controlled and a control amount by which power demand is controlled, a determining unit that determines, based on the adjustment request, a first consumer whose power demand is to be controlled, a control amount of the first consumer, and a time period during which power demand of the first consumer is controlled, and an inference unit that infers whether, when power demand of the first consumer is controlled in accordance with a determination result made by the determining unit, power demand of the first consumer before and/or after control changes from power demand of the first consumer when the power demand is not controlled.

According to the present invention, a processing method executed by a compute is provided, which includes an acquiring step of acquiring an adjustment request specifying a control time period during which power demand is controlled and a control amount by which power demand is controlled, a determining step of determining, based on the adjustment request, a first consumer whose power demand is to be controlled, a control amount of the first consumer, and a time period during which power demand of the first consumer is controlled, and an inference step of inferring whether, when power demand of the first consumer is controlled in accordance with a determination result made in the determining step, power demand of the first consumer before and/or after control changes from power demand of the first consumer when the power demand is not controlled.

According to the present invention, a program is provided that causes a computer to function as an acquiring unit that acquires an adjustment request specifying a control time period during which power demand is controlled and a control amount by which power demand is controlled, a determining unit that determines, based on the adjustment request, a first consumer whose power demand is to be controlled, a control amount of the first consumer, and a time period during which power demand of the first consumer is controlled, and an inference unit that infers whether, when power demand of the first consumer is controlled in accordance with a determination result made by the determining unit, power demand of the first consumer before and/or after control changes from power demand of the first consumer when the power demand is not controlled.

Advantageous Effects of Invention

According to the present invention, a technique contributing to adjustment of supply-demand balance in a power system is provided.

BRIEF DESCRIPTION OF DRAWINGS

The above-described object and other objects, features, and advantages will be more apparent by the preferred example embodiments described below and the following drawings accompanying therewith.

FIG. 5 is a diagram schematically illustrating an example of information processed by the processing apparatus of the present example embodiment.

FIG. 6 is a diagram schematically illustrating an example of other information processed by the processing apparatus of the present example embodiment.

EXAMPLE EMBODIMENT

First Example Embodiment

First, an outline of a processing apparatus of the present example embodiment will be described. The processing apparatus of the present example embodiment is used by a resource aggregator. The resource aggregator provides services to fulfill adjustment requests (power demand suppression, power demand promotion, and the like) from electricity transmission and distribution utilities, electricity retailer, electricity generation utilities, and the like by utilizing resources (such as storage batteries and electric equipment) of consumers. The processing apparatus determines consumers whose resources are to be utilized and details of the utilization for each adjustment request.

The processing apparatus of the present example embodiment has characteristic functions as follows. That is, the processing apparatus determines consumers whose power demand is to be controlled in response to an adjustment request to control power demand, details of the control, and the like and subsequently infers an effect of performing control of power demand in accordance with the determined details. Specifically, the processing apparatus infers whether power demand before and/or after control when the power demand is controlled in accordance with the determined details changes (increases or decreases) from power demand when the power demand is not controlled.

Figure 1:
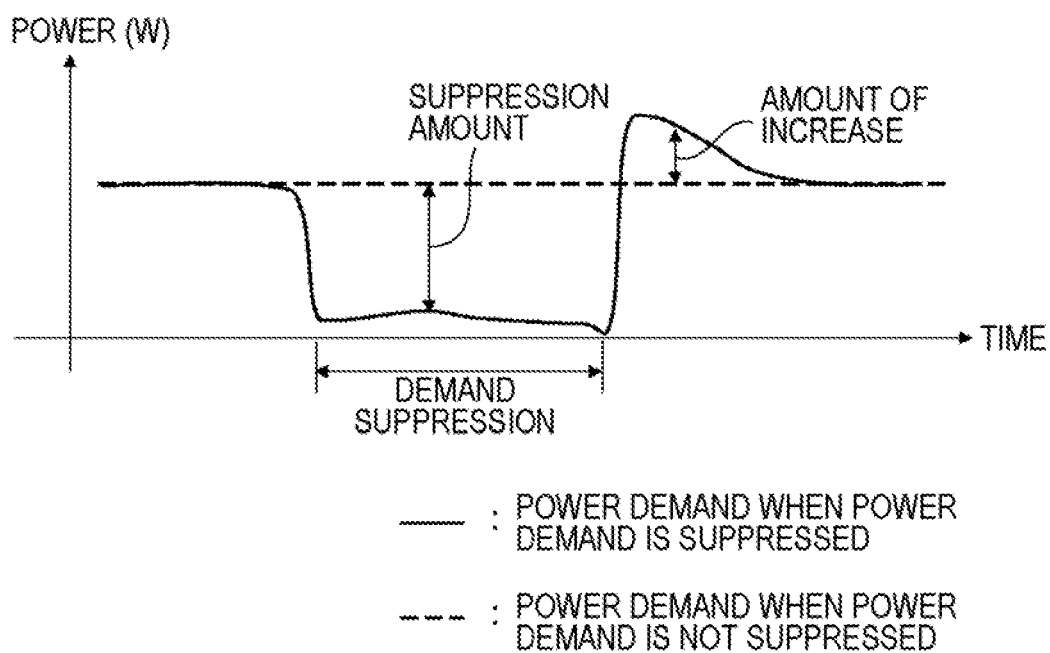
FIG. 1 is a diagram for a description of an increase in power demand caused by suppression of the power demand.

For example, when heating of a room is stopped in response to a power demand suppression request, the temperature of the room may become lower than that when the heating is kept operating without being stopped. Thus, the power consumption of heating at a point in time (a first point of time) immediately after termination of suppression in which the heating was stopped in response to a power demand suppression request may become greater than the power consumption of heating at the first point of time when the heating has been kept operating without suppressing power demand (see FIG. 1).

Figure 2:
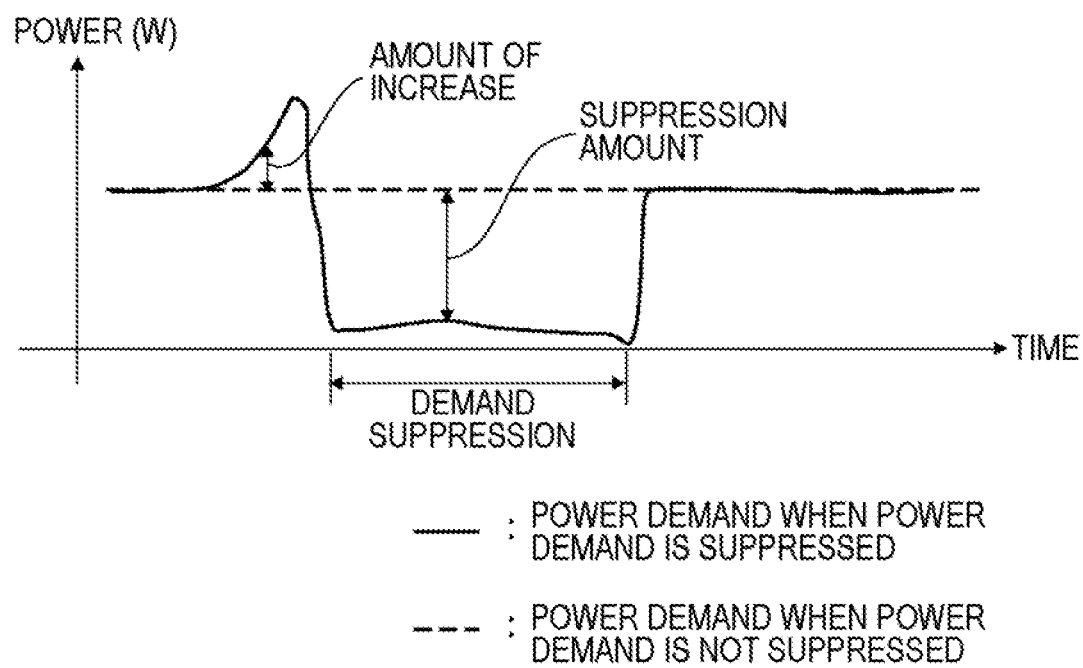
FIG. 2 is a diagram for a description of another increase in the power demand caused by suppression of the power demand.

Among consumers responding to a power demand suppression request, there may exists a consumer who dislikes that the temperature of a room decreases and raises the temperature setting of heating before suppressing power demand. In such a case, the power consumption of heating at a point in time (a second point of time) immediately before suppression in which power demand is suppressed in response to a power demand suppression request may become greater than the power consumption of heating at the second point of time when the heating is kept operating without suppressing power demand (see FIG. 2).

Figure 10:
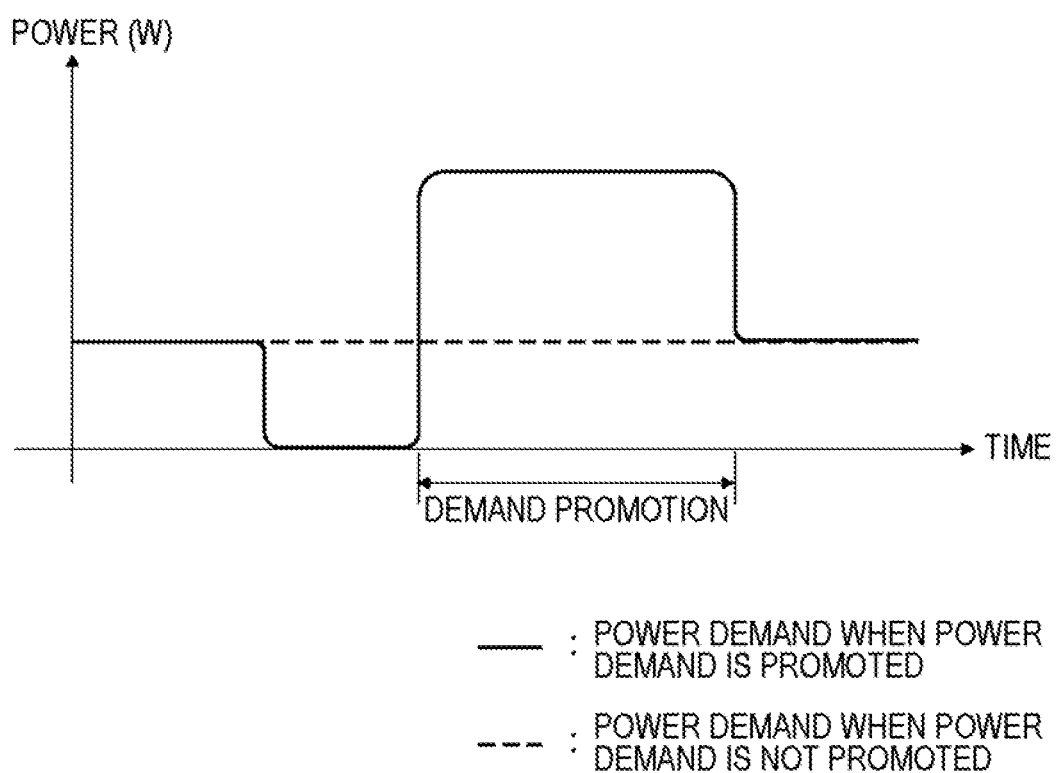
FIG. 10 is a diagram for a description of a decrease in power demand caused by promotion of the power demand.

When the amount of charging to a storage battery in a predetermined time period is to be increased in response to a power demand promotion request, charging in a time period immediately before the predetermined time period is sometimes suppressed or stopped in order to secure the charging in the predetermined time period. In such a case, charging power to a storage battery at a point in time (a third point of time) immediately before promotion in which power demand is promoted in the predetermined time period in response to a power demand promotion request may become smaller than charging power at the third point of time when the charging is kept performed without promoting power demand (see FIG. 10).

Such change (increase or decrease) in power demand before and after control caused by control of power demand may affect adjustment of supply-demand balance in a power system. The processing apparatus of the present example embodiment enables inference as to whether an event (the change described above) that may affect adjustment of supply-demand balance in the power system occurs.

Hereinafter, a configuration of the processing apparatus of the present example embodiment will be described in detail. First, an example of a hardware configuration of the processing apparatus will be described. Functions with which the processing apparatus of the present example embodiment is provided are achieved by any combination of hardware and software, which mainly include a central processing unit (CPU), a memory, programs that are loaded in the memory, a storage unit, such as a hard disk, that stores the programs (the storage unit can store not only a program that has been stored in advance since a shipment stage of the apparatus but also a program that is downloaded from a storage medium, such as a compact disc (CD), or a server or the like on the Internet), and an interface for network connection in any computer. It should be understood by those skilled in the art that there are various variations for a method and an apparatus to achieve the functions.

Figure 3:
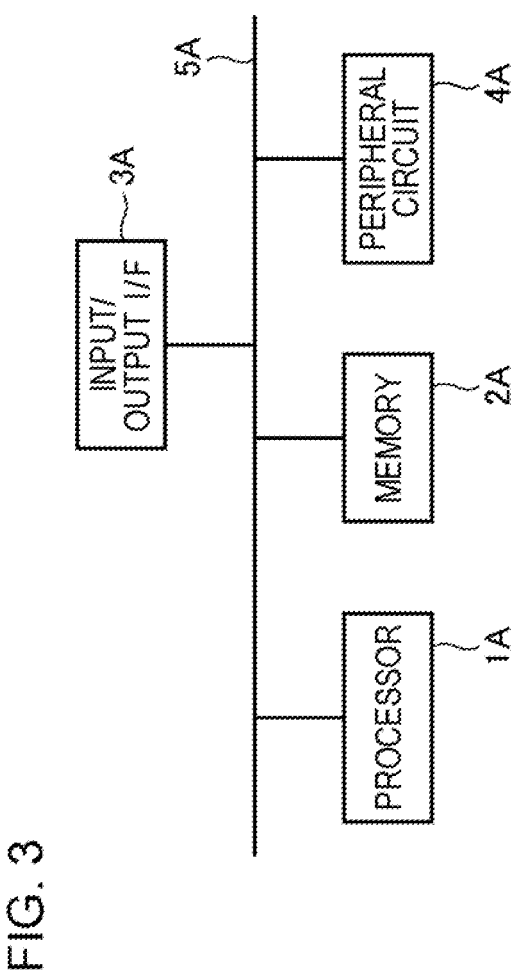
FIG. 3 is a diagram illustrating an example of a hardware configuration of a processing apparatus of a present example embodiment.

FIG. 3 is a block diagram illustrating a hardware configuration of the processing apparatus of the present example embodiment. As illustrated in FIG. 3, the processing apparatus includes a processor 1A, a memory 2A, an input/output interface 3A, a peripheral circuit 4A, and a bus 5A. In the peripheral circuit 4A, various modules are included. A processing apparatus does not have to include the peripheral circuit 4A.

The bus 5A is a data transmission line through which the processor 1A, the memory 2A, the peripheral circuit 4A, and the input/output interface 3A transmit and receive data to and from one another. The processor 1A is an arithmetic processing unit, such as a central processing unit (CPU) and a graphic processing unit (GPU). The memory 2A is a memory, such as a random access memory (RAM) and a read only memory (ROM). The input/output interface 3A includes, for example, an interface for acquiring information from an input apparatus (such as a keyboard, a mouse, and a microphone), an external apparatus, an external server, an external sensor, or the like and an interface for outputting information to an output apparatus (such as a display, a speaker, a printer, and an emailer), an external apparatus, an external server, or the like. The processor 1A can send commands to the modules and perform calculation, based on calculation results of the modules.

Figure 4:
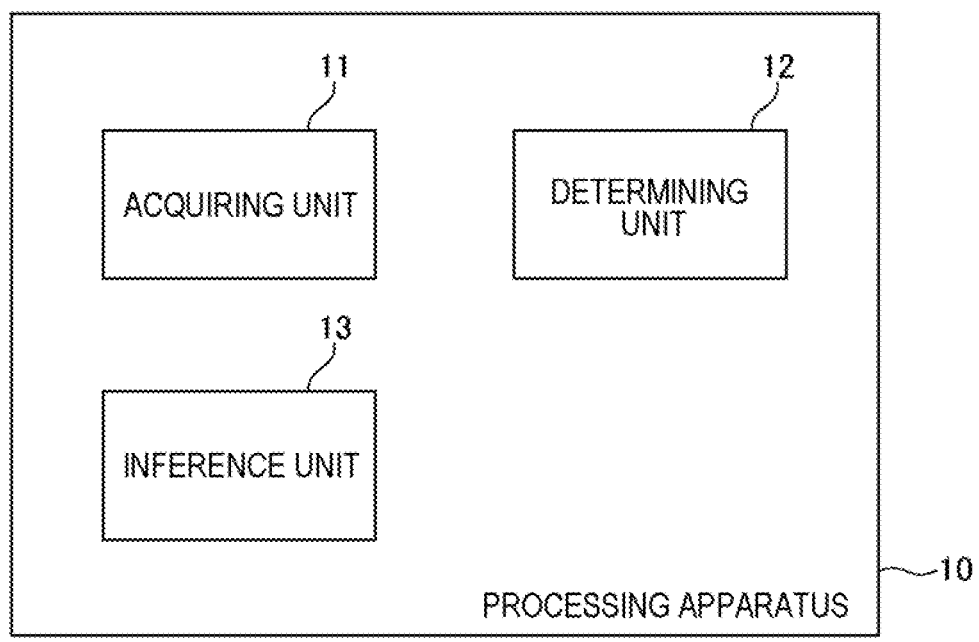
FIG. 4 is a diagram illustrating an example of a functional block diagram of the processing apparatus of the present example embodiment.

Next, a functional configuration of the processing apparatus will be described. In FIG. 4, an example of a functional block diagram of a processing apparatus 10 is illustrated. As illustrated in the drawing, the processing apparatus 10 includes an acquiring unit 11, a determining unit 12, and an inference unit 13.

The acquiring unit 11 acquires an adjustment request to control power demand. The acquiring unit 11 acquires, for example, an adjustment request to suppress power demand or an adjustment request to promote power demand. The acquiring unit 11 may receive an adjustment request transmitted from a system of an electricity transmission and distribution utility, an electricity retailer, an electricity generation utility, or the like. The systems and the processing apparatus 10 may be configured to be communicable with each other via any communication network (such as the Internet and a local area network (LAN)). Alternatively, an operator of the processing apparatus 10 may input details of an adjustment request received from an electricity transmission and distribution utility, an electricity retailer, an electricity generation utility, or the like into the processing apparatus 10. Note that, such means are no more than examples and the acquiring unit 11 may acquire an adjustment request by means of other means.

In an adjustment request, a control time period, a control amount (such as a demand suppression amount and a demand promotion amount), and the like are specified. A control time period is specified by a date, a control start time, a control end time, and the like, such as "13:00-15:00, Aug. 10, 2017".

A control amount is indicated by, for example, suppressed power [W] or promoted power [W] during a control time period. The suppressed power [W] indicates power demand [W] to be suppressed. The promoted power [W] indicates power demand [W] to be promoted. Note that, the suppressed power [W] and the promoted power [W] may be constant or vary during a control time period. When the suppressed power [W] or the promoted power [W] varies, a temporal change in the suppressed power [W] or the promoted power [W] during a control time period is specified in an adjustment request. The control time period may be divided into a plurality of time periods and suppressed power [W] may be specified with respect to each of the divided time periods, such as "13:00-13:30, Aug. 10, 2017, suppressed power: X1 W", "13:30-14:00, Aug. 10, 2017, suppressed power: X2 W", "14:00-14:30, Aug. 10, 2017, suppressed power: X3 W", and "14:30-15:00, Aug. 10, 2017, suppressed power: X4 W". The same applies to promoted power [W]. The duration of each of divided time periods is a matter of design variation that can be determined in any manner. Alternatively, temporal change in suppressed power [W] or promoted power [W] during a control time period may be specified using a function or the like.

The determining unit 12 determines, with respect to each adjustment request, a consumer (hereinafter, referred to as a "first consumer") whose power demand is to be controlled and a control amount by which and a time period during which the power demand of the first consumer is controlled, based on details of the adjustment request. For example, the determining unit 12 may determine a first consumer whose power demand is to be suppressed and a suppression amount by which and a time period during which the power demand of the first consumer is suppressed, based on an adjustment request for power demand suppression. The determining unit 12 may also determine a first consumer whose power demand is to be promoted and a promotion amount by which and a time period during which the power demand of the first consumer is promoted, based on an adjustment request for power demand promotion.

Information on consumers (hereinafter, referred to as "contracted consumers") who have agreed to utilization of resources of the consumers by a resource aggregator in advance is registered in a system of the resource aggregator. Based on information indicating registered contracted consumers, the determining unit 12 determines first consumers from among the contracted consumers. The determining unit 12 also determines a control amount (hereinafter, referred to as an "individual control amount") by which and a time period (hereinafter, referred to as an "individual control time period") during which power demand of each of the determined first consumers is controlled.

An individual control time period is at least a portion of a control time period. The individual control time period may be a portion of or the whole of the control time period. A first consumer whose individual control time period is a portion of the control time period and a first consumer whose individual control time period is the whole of the control time period may coexist. For example, when the control time period is "13:00-15:00, Aug. 10, 2017", a first consumer whose individual control time period is "13:00-14:00, Aug. 10, 2017" and a first consumer whose individual control time period is "13:00-15:00, Aug. 10, 2017" may coexist.

Among first consumers whose individual control time periods are portions of the control time period, first consumers whose individual control time periods do not completely coincide with one another may coexist. For example, when the control time period is "13:00-15:00, Aug. 10, 2017", a first consumer whose individual control time period is "13:00-14:00, Aug. 10, 2017", a first consumer whose individual control time period is "13:00-14:30, Aug. 10, 2017", and a first consumer whose individual control time period is "14:00-15:00, Aug. 10, 2017" may coexist.

For example, the determining unit 12 may divide a control time period into a plurality of time periods and determine a first consumer whose power demand is to be controlled with respect to each of the divided time periods (hereinafter, sometimes referred to as "divided control time periods"). When first consumers are determined in such a manner, a situation may occur in which various types of individual control time periods (the whole of a control time period, a portion of the control time period, another portion of the control time period, and the like) coexist as described above.

Alternatively, the determining unit 12 may determine a first consumer whose power demand is to be controlled with respect to each control time period. When first consumers are determined in such a manner, a situation occurs in which only first consumers whose individual control time periods coincide with the whole of the control time period exist.

An individual control amount is indicated by, for example, suppressed power [W] or promoted power [W] during an individual control time period. The suppressed power [W] indicates power demand [W] to be suppressed. The promoted power [W] indicates power demand [W] to be promoted. Hereinafter, suppressed power [W] of each first consumer is referred to as individual suppressed power [W]. In addition, promoted power [W] of each first consumer is referred to as individual promoted power [W].

Individual suppressed power [W] and individual promoted power [W] may be constant or vary during an individual control time period. When individual suppressed power [W] varies, the individual control time period may be divided into a plurality of time periods and the individual suppressed power [W] may be specified with respect to each of the divided time periods, such as "13:00-13:30, Aug. 10, 2017, individual suppressed power: x1 W" and "13:30-14:00, Aug. 10, 2017, individual suppressed power: x2 W". The same applies to individual promoted power [W]. The duration of each of divided time periods is a matter of design variation that can be determined in any manner. Alternatively, temporal change in individual suppressed power [W] or individual promoted power [W] during an individual control time period may be specified using a function or the like.

The determining unit 12 determines first consumers and an individual control time period and an individual control amount of each of the first consumers in such a way as to fulfill an adjustment request. A means to achieve the determination is not particularly limited, and any techniques can be employed. Although an example of the means to achieve the determination will be described below, the means is only an example and is not limited to the example.

For example, the determining unit 12 can use resource utilization conditions that each contracted consumer has specified, past actual utilization results of resources of the contracted consumer, a prediction of power demand of the contracted consumer on the day, and the like.

As resource utilization conditions, as illustrated in, for example, FIG. 5, a period during which resources is allowed to be utilized (a resource utilization period), a time period during which the resources is allowed to be utilized (resource utilization time period), upper limits for resource utilization (a suppressed power upper limit and a promoted power upper limit), and the like may be specified. As a resource utilization period, a month(s), a day(s) of the week, or the like may be specified. As a suppressed power upper limit, an upper limit for power demand [W] allowed to be suppressed is specified. As a promoted power upper limit, an upper limit for power demand [W] allowed to be promoted is specified. The suppressed power upper limit and the promoted power upper limit to be specified may be constant during the resource utilization time period. Alternatively, the resource utilization time period may be divided into a plurality of time periods and a suppressed power upper limit and a promoted power upper limit may be specified with respect to each of the divided time periods. The duration of each of divided time periods is a matter of design variation that can be determined in any manner.

As past actual utilization results, a date and time when resources were utilized in the past, utilization details (suppressed power [W] or promoted power [W]), and the like may be indicated.

The prediction of power demand of each contracted consumer on the day is generated based on weather, temperature, a day of the week, and the month of the day, past actual results of power demand of the contracted consumer, and the like. The prediction may be achieved by employing any techniques.

The determining unit 12 may determine, for example, a contracted consumer who satisfies the following conditions as a first consumer who responds to an adjustment request for power demand suppression.

The date specified in the adjustment request as a date on which power demand control is to be performed is included in the resource utilization period.

The control time period specified in the adjustment request is completely included in a resource utilization time period.

In a prediction of power demand of the contracted consumer on the day, power demand during the control time period is indicated. That is, it is predicted that there may be power demand that can be suppressed during the control time period.

Note that, when the control time period is divided into a plurality of time periods and a first consumer is determined with respect to each of the divided time periods (divided control time period), the determining unit 12 may determine, for example, a contracted consumer who satisfies the following conditions as a first consumer who responds to an adjustment request for power demand suppression with respect to each of the divided time periods.

The date specified in the adjustment request as a date on which power demand suppression is to be performed is included in the resource utilization period.

The divided control time period is completely included in the resource utilization time period.

In a prediction of power demand of the contracted consumer on the day, power demand during the divided control time period is indicated. That is, it is predicted that there may be power demand that can be suppressed during the divided control time period.

The determining unit 12 may also determine, for example, a contracted consumer who satisfies the following conditions as a first consumer who responds to an adjustment request for power demand promotion.

The date specified in the adjustment request as a date on which power demand control is to be performed is included in the resource utilization period.

The control time period specified in the adjustment request is completely included in the resource utilization time period.

Alternatively, the determining unit 12 may send, to contracted consumers, a notification showing a time period during which power demand is to be controlled and calling for participation in the power demand control. Still alternatively, the determining unit 12 may send, to contracted consumers, a notification showing divided control time periods and calling for participation in the power demand control with respect to each divided control time period.

The notification may be achieved by means of electronic mail or push notification of an application, or achieved by means of any other means. Each contracted consumer who participates in the power demand control may send a reply indicating an intention of participation to the processing apparatus 10. In the reply, resource utilization conditions may be specified. Such a reply may be achieved by means of electronic mail or achieved by way of an application, a website, or the like that the resource aggregator provides. Note that, resource utilization conditions of each contracted consumer may be registered in the system of the resource aggregator in advance.

The determining unit 12 may determine a contracted consumer who has expressed an intention of participation as a first consumer. When participation is called for with respect to each divided control time period, the determining unit 12 can determine a contracted consumer who has expressed an intention of participation in each divided control time period as a first consumer in the divided control time period.

Note that, when the number of first consumers determined by using the exemplified method described above exceeds a preset upper limit value, the first consumers may be narrowed down based on past actual utilization results. For example, a contracted consumer whose date on which resources were utilized most recently is old may be preferentially chosen as a first consumer. Alternatively, a contracted consumer whose accumulated value of the amount of utilization of resources (a suppressed power amount [Wh] or a promoted power amount [Wh]) is small may be preferentially chosen as a first consumer. This configuration enables opportunities of being chosen as a first consumer to be equally provided to contracted consumers.

The determining unit 12 allocates a control amount specified in an adjustment request to a plurality of first consumers. The determining unit 12 may divide the control amount equally to the plurality of first consumers or proportionally to the plurality of first consumers according to a predetermined ratio (for example, a ratio of resource utilization upper limits, demand predictions, rated capacities of storage batteries, or rated outputs of storage batteries).

For example, when first consumers whose power demands are to be controlled are determined with respect to each divided control time period, the determining unit 12 may, with respect to each divided control time period, allocate a control amount (suppressed power [W] or promoted power [W]) during the divided control time period which is specified in the adjustment request to a plurality of first consumers in the divided control time period equally or according to a predetermined proportional division ratio.

Alternatively, when first consumers whose power demands are to be controlled are determined with respect to each control time period, the determining unit 12 may, with respect to each control time period, allocate a control amount (suppressed power [W] or promoted power [W]) specified in the adjustment request to a plurality of first consumers equally or according to a predetermined proportional division ratio.

Through, for example, the processing as described above, first consumers, who are at least some of the contracted consumers, are determined. With respect to each first consumer, a time period (individual control time period) during which power demand is controlled and control details (individual control amount) are also determined.

The inference unit 13 infers whether, when power demand of a first consumer is controlled in accordance with a determination result by the determining unit 12, power demand of the first consumer before and/or after control changes from power demand of the first consumer when the power demand is not controlled. Hereinafter, the change is referred to as "control-caused change". For example, the inference unit 13 may infer whether, when power demand of a first consumer is suppressed in accordance with a determination result made by the determining unit 12, power demand of the first consumer before and/or after control changes (for example, increases or decreases) from power demand of the first consumer when the power demand is not suppressed. The inference unit 13 may also infer whether, when power demand of a first consumer is promoted in accordance with a determination result made by the determining unit 12, power demand of the first consumer before and/or after control changes (for example, increases or decreases) from power demand of the first consumer in a case in which the power demand is not promoted. Hereinafter, inference methods will be exemplified.

(First Inference Method)

The inference unit 13 infers whether a control-caused change occurs, based on a power demand prediction (hereinafter, referred to as a "controlled power demand prediction") of a first consumer when power demand is controlled and a power demand prediction (hereinafter, referred to as an "uncontrolled power demand prediction") of the first consumer when the power demand is not controlled.

The controlled power demand prediction is a prediction of power demand [W] of a first consumer when the power demand is suppressed or a prediction of power demand [W] of the first consumer when the power demand is promoted. The uncontrolled power demand prediction is a prediction of power demand [W] of the first consumer when the power demand is not suppressed or a prediction of power demand [W] of the first consumer when the power demand is not promoted.

Specifically, first, the inference unit 13 acquires a controlled power demand prediction and an uncontrolled power demand prediction with respect to each first consumer.

The controlled power demand prediction and the uncontrolled power demand prediction can be estimated based on environmental information (a month, a day, a day of the week, weather, temperature, and the like) during a control time period on the day during which power demand is to be controlled, actual power demand results of each contracted consumer and environmental information in the past when power demand control was not performed, actual power demand results of each contracted consumer, environmental information, and details of demand control (an individual control time period and an individual control amount) in the past when power demand suppression was performed, and the like.

For example, by performing, with respect to each contracted consumer, machine learning, using the actual power demand results and the environmental information in the past when power demand was not controlled as training data, an estimation model to estimate power demand when the power demand is not controlled from environmental information may be generated. An uncontrolled power demand prediction with respect to each first consumer on the day when power demand is to be controlled may be obtained by inputting the environmental information during the control time period on the day during which the power demand is to be controlled into the estimation model of the first consumer.

By performing, with respect to each contracted consumer, machine learning, using the actual power demand results, the environmental information, and the details of demand control in the past when power demand was controlled as training data, an estimation model to estimate power demand when the power demand is controlled from environmental information and details of demand control may be generated. A controlled power demand prediction with respect to each first consumer on the day when power demand is to be controlled may be obtained by inputting the environmental information during the control time period on the day during which the power demand is to be controlled and an individual control time period and an individual control amount of the first consumer determined by the determining unit 12 into the estimation model of the first consumer.

The inference unit 13 computes a total controlled power demand prediction by time synchronizing and summing up controlled power demand predictions of all first consumers. The inference unit 13 also computes a total uncontrolled power demand prediction by time synchronizing and summing up uncontrolled power demand predictions of all first consumers. The total controlled power demand prediction and the total uncontrolled power demand prediction are indicated by temporal change in power demand [W].

Subsequently, the inference unit 13 compares a magnitude relation between a total controlled power demand prediction and a total uncontrolled power demand prediction at each time point.

When power demands of first consumers are to be suppressed based on an adjustment request for power demand suppression, the inference unit 13 infers a timing (time point) at which (total controlled power demand prediction)>{(total uncontrolled power demand prediction)−(suppressed power)} is satisfied as a timing at which a control-caused change (increase) occurs. Note that, the inference unit 13 may infer a timing (time point) at which {(total uncontrolled power demand prediction)−(suppressed power)}>(total controlled power demand prediction) is satisfied as a timing at which a control-caused change (decrease) occurs. The suppressed power [W] at a timing that is not included in the control time period is "0".

Note that, the inference unit 13 may compute a change in power demand at each timing at which a control-caused change occurs as control-caused changed power [W] at the timing. The control-caused changed power [W] may be defined as, for example, a difference between (the sum of a total controlled power demand prediction and suppressed power) and (a total uncontrolled power demand prediction). The inference unit 13 may also compute an integrated value of the control-caused changed power [W] as a control-caused changed power amount [Wh]. As the integrated value, an integrated value of increases, an integrated value of decreases, an integrated value obtained by assigning opposite signs to and summing up increases and decreases, or the like may be employed.

When power demands of first consumers are to be promoted based on an adjustment request for power demand promotion, the inference unit 13 infers a timing (time point) at which (total uncontrolled power demand prediction)>{(total controlled power demand prediction)−(promoted power)} is satisfied as a timing at which a control-caused change (decrease) occurs. Note that, the inference unit 13 may infer a timing (time point) at which {(total controlled power demand prediction)−(promoted power)}>(total uncontrolled power demand prediction) is satisfied as a timing at which a control-caused change (increase) occurs. The promoted power [W] at a timing that is not included in the control time period is "0".

Note that, the inference unit 13 may compute a change in power demand at each timing at which a control-caused change occurs as control-caused changed power [W] at the timing. The control-caused changed power [W] may be defined as, for example, a difference between (total uncontrolled power demand prediction) and (sum of a total controlled power demand prediction and promoted power). The inference unit 13 may also compute an integrated value of the control-caused changed power [W] as a control-caused changed power amount [Wh]. As the integrated value, an integrated value of increases, an integrated value of decreases, an integrated value obtained by assigning opposite signs to and summing up increases and decreases, or the like may be employed.

The inference unit 13 may also infer whether a control-caused change occurs in the control time period. The inference unit 13 may compute a control-caused changed power [W] and a control-caused changed power amount [Wh] during the control time period.

(Second Inference Method)

As a prerequisite when a second inference method is performed, information on electric equipment (a type, a manufacturer, a model number, a purchase date, and the like of each piece of electric equipment) that each contracted consumer possesses is registered into the system of the resource aggregator in advance, as illustrated in FIG. 6. The determining unit 12 determines, with respect to each first consumer, pieces of electric equipment the operation of which is to be controlled in order to control power demand. The method for determining pieces of electric equipment to be controlled is a matter of design variation.

With respect to each piece of electric equipment, change in power consumption [W] of the piece of electric equipment when an operation is performed in which the operation of the piece of electric equipment in operation is suspended for a certain period and subsequently the operation is resumed is measured in advance. Change in the power consumption [W] of the piece of electric equipment in the case where conditions differ from those in the above-described measurement only in that the piece of electric equipment is kept operating without suspending the operation for a certain period is also measured. A difference between (temporal change in the power consumption [W] in the case of suspension for a certain period) and (temporal change in the power consumption [W] in the case of without suspension for a certain period) is obtained as change data indicating temporal change in the power consumption [W] that has increased caused by the suspension for a certain period.

The change data and environmental information (a month, a day, weather, temperature, and the like) at the time of measurement are stored in association with each other. The above-described measurement is performed under various environments and a large amount of information is thereby accumulated. Note that, the above-described measurement may be performed using pieces of electric equipment that each contracted consumer possesses (the contracted consumer's property) or using pieces of electric equipment (not the contracted consumer's property) having the same model numbers as the pieces of electric equipment that each contracted consumer possesses. In the former case, since change data reflecting conditions (aging degradation and the like) of the pieces of electric equipment can be obtained, inference precision improves.

The inference unit 13 infers whether a control-caused change occurs, based on information on pieces of electric equipment the operations of which are to be controlled.

For example, with respect to each piece of electric equipment, by performing machine learning using the above-described change data and environmental information as training data, an estimation model that predicts temporal change in power consumption [W] that changes (for example, increases or decreases) when power demand is controlled (for example, power demand is suppressed) is generated. By inputting environmental information during a control time period on the day during which power demand is controlled into the estimation model of each piece of electric equipment, temporal change (hereinafter, referred to as "temporal change data") in power consumption [W] that changes (for example, increases or decreases) when the operation of the piece of electric equipment the operation of which is to be controlled is controlled is obtained.

By time synchronizing and summing up the above-described temporal change data of the plurality of pieces of electric equipment the operations of which are to be controlled, the inference unit 13 obtains data indicating temporal change in power demand that changes (for example, increases or decreases) when the power demand is controlled. The inference unit 13 infers a timing at which the amount of change (for example, the amount of increase or the amount of decrease) is greater than a criterion value (a value equal to or more than 0 [W]) as a timing at which a control-caused change occurs. The inference unit 13 may determine whether a control-caused change occurs in the control time period.

Note that, the inference unit 13 may compute an integrated value of the above-described amount of change as a control-caused increased power amount [Wh]. The inference unit 13 may also compute an integrated value of the above-described amount of change during the control time period as a control-caused increased power amount [Wh] during the control time period.

Figure 7:
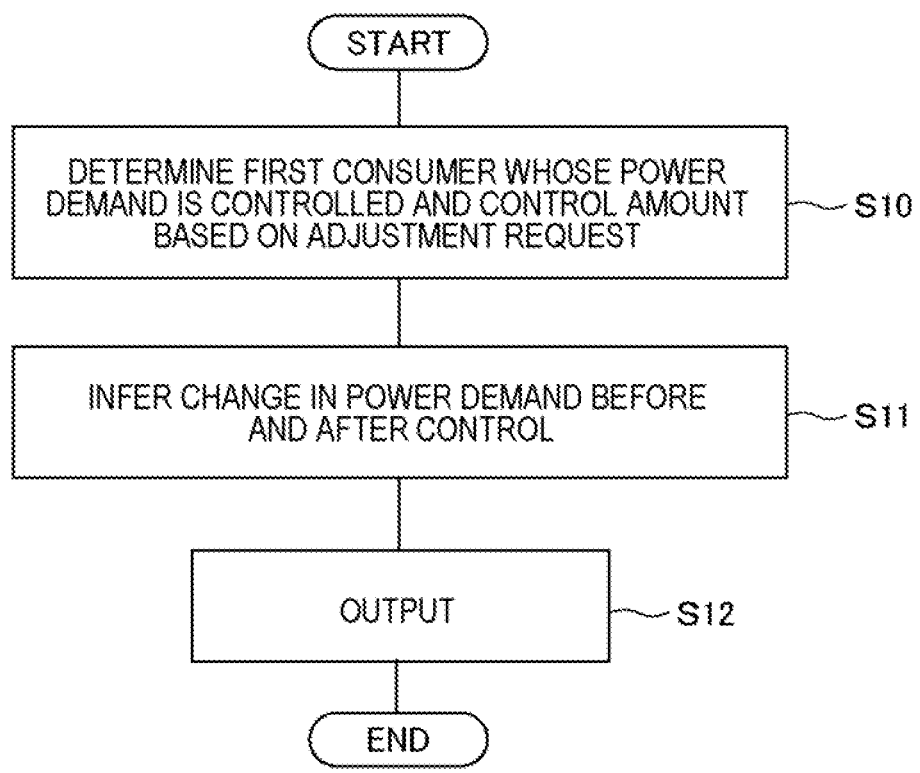
FIG. 7 is a flowchart illustrating an example of a processing flow of the processing apparatus of the present example embodiment.

Next, using a flowchart in FIG. 7, an example of a processing flow of the processing apparatus 10 of the present example embodiment will be described.

In S10, the determining unit 12 determines a first consumer whose power demand is to be controlled and an individual control amount by which and an individual control time period during which the power demand of the first consumer is controlled, based on an "adjustment request in which a control time period during which and a control amount by which power demand is controlled are specified", which was acquired by the acquiring unit 11.

In S11, the inference unit 13 infers whether, when power demand of the first consumer is controlled in accordance with a determination result by the determining unit 12, power demand of the first consumer before and/or after control changes from power demand of the first consumer when the power demand is not controlled.

In S12, the inference unit 13 outputs a result of the inference. The result of the inference is output via every possible output apparatus, such as a display, an emailer, and a speaker.

According to the processing apparatus 10 of the present example embodiment that has been described thus far, it is possible to infer whether, when power demand is controlled, the power demand before and after the control changes compared with power demand when the power demand is not controlled. It is also possible to infer the amount of change (change in power [W] and a power amount [Wh]). Performing adjustment of supply-demand balance in a power system in consideration of the result of the inference enables adjustment of supply-demand balance in the power system to be performed with good precision.

In the case of the present example embodiment, it is also possible to infer whether a control-caused change occurs in a "control time period" specified in an adjustment request and the amount of change (change in power [W] and a power amount [Wh]). Since a control time period is a time period during which adjustment of supply-demand balance in the power system is difficult, every possible information that may affect the supply-demand balance is expected to be provided. According to the processing apparatus 10 of the present example embodiment that is capable of inferring whether a control-caused change occurs in a "control time period" specified in an adjustment request and the amount of change (change in power [W] and a power amount [Wh]), it becomes possible to perform the adjustment of supply-demand balance in the power system with good precision.

Figure 8:
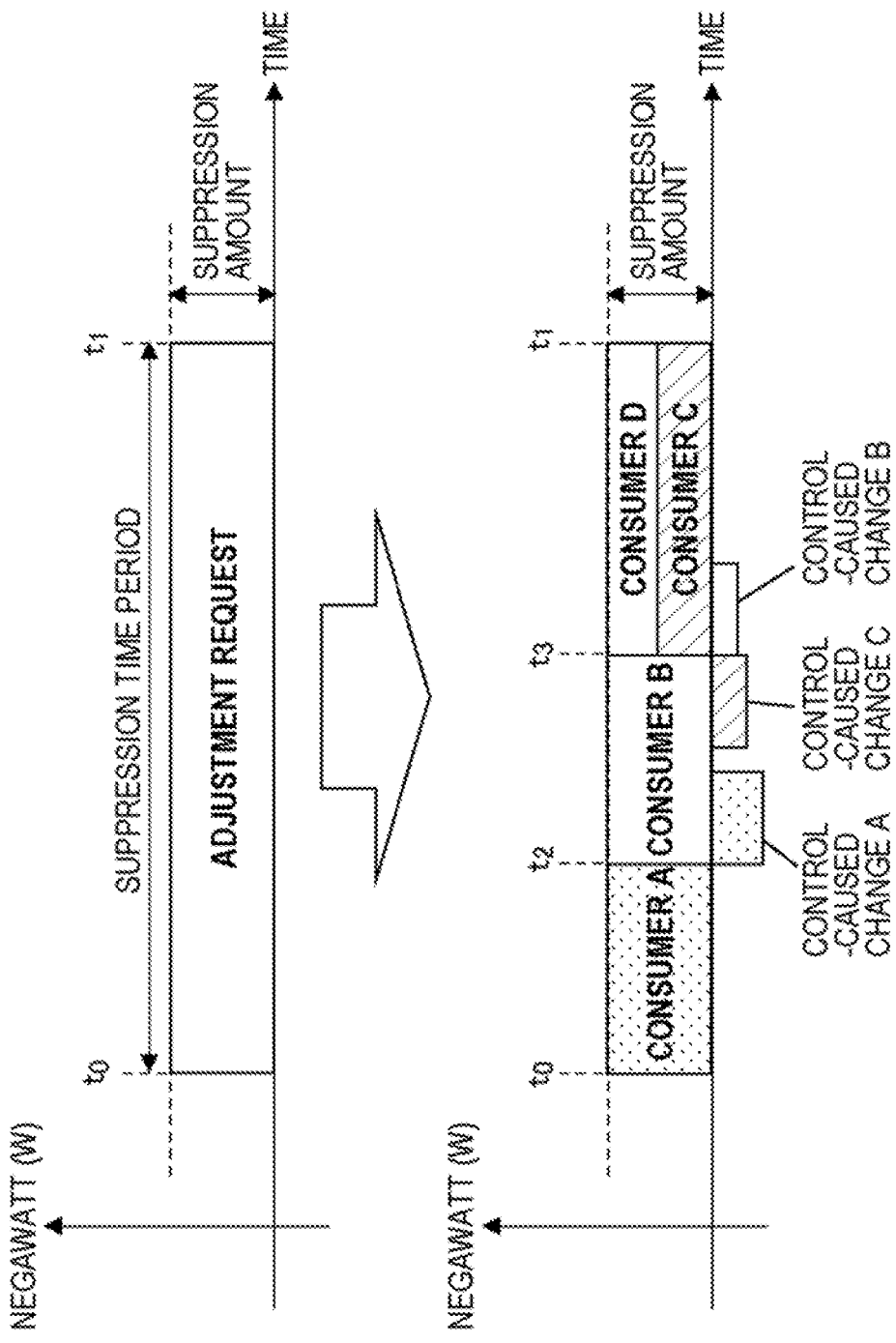
FIG. 8 is a diagram illustrating an example of first consumers and control details for the first consumers determined based on an adjustment request and, further, control-caused changes for the first consumers.

Note that, a situation in which a suppression-caused increase occurs during a control time period may occur when, as illustrated in FIG. 8, an individual control time period of each of first consumers (consumers A to D illustrated in the drawing) is a portion of the control time period specified in the adjustment request. In the illustrated case, a control time period is from $t_0$ to $t_1$, an individual control time period of the consumer A is from $t_0$ to $t_2$, an individual control time period of the consumer B is from $t_2$ to $t_3$, and individual control time periods of the consumers C and D are from $t_3$ to $t_1$.

As illustrated in the drawing, regarding the consumer A, a control-caused change after control may occur within the control time period (control-caused change A). As illustrated in the drawing, regarding the consumer B, a control-caused change after control may also occur within the control time period (control-caused change B). Note that, although not illustrated, regarding the consumer B, a control-caused change before the control may occur during the control time period. As illustrated in the drawing, regarding the consumer C, a control-caused change before control may occur during the control time period (control-caused change C). Note that, although not illustrated, regarding the consumer D, a control-caused change before control may occur within the control time period.

Second Example Embodiment

A processing apparatus 10 of the present example embodiment differs from the processing apparatus 10 of the first example embodiment in that the processing apparatus 10 of the present example embodiment includes a means for, when a control-caused change is inferred to occur, determining a consumer whose power demand equivalent to the change is to be controlled (for example, power demand equivalent to an increase is suppressed or power demand equivalent to a decrease is promoted).

Hereinafter, a configuration of the processing apparatus 10 of the present example embodiment will be described in detail. An example of a hardware configuration of the processing apparatus 10 is the same as that of the first example embodiment.

An example of a functional block diagram of the processing apparatus 10 is, as with the first example embodiment, illustrated in FIG. 4. As illustrated in the drawing, the processing apparatus 10 includes an acquiring unit 11, a determining unit 12, and an inference unit 13. Configurations of the acquiring unit 11 and the inference unit 13 are the same as those of the first example embodiment.

When a control-caused change is inferred to occur, the determining unit 12 determines a second consumer whose power demand equivalent to the change is to be controlled and a control amount (individual control amount) by which and a time period (individual control time period) during which the power demand of the second consumer is controlled.

For example, when an increase (control-caused change) in power demand caused by power demand suppression is inferred to occur, the determining unit 12 may determine a second consumer whose power demand equivalent to the increase is to be suppressed and a suppression amount (individual suppression amount) and an individual control time period of the second consumer. When a decrease (control-caused change) in power demand caused by power demand promotion is inferred to occur, the determining unit 12 may determine a second consumer whose power demand equivalent to the decrease is to be promoted and a promotion amount (individual promotion amount) and an individual control time period of the second consumer.

Note that, when a control-caused change is inferred to occur during a control time period, the determining unit 12 may determine a second consumer whose power demand equivalent to the change in the control time period is to be controlled and a control amount (individual control amount) by which and a time period (individual control time period) during which the power demand of the second consumer is controlled.

For example, it is assumed that, as illustrated in FIG. 8, first consumers (consumers A to D illustrated in the drawing) and control details for the first consumers are determined based on an adjustment request and control-caused changes with respect to the first consumers are inferred as illustrated in the drawing. Note that, in the example, the adjustment request is a request for power demand suppression and the control-caused changes are increases in power demand caused by the request for power demand suppression.

Figure 11:
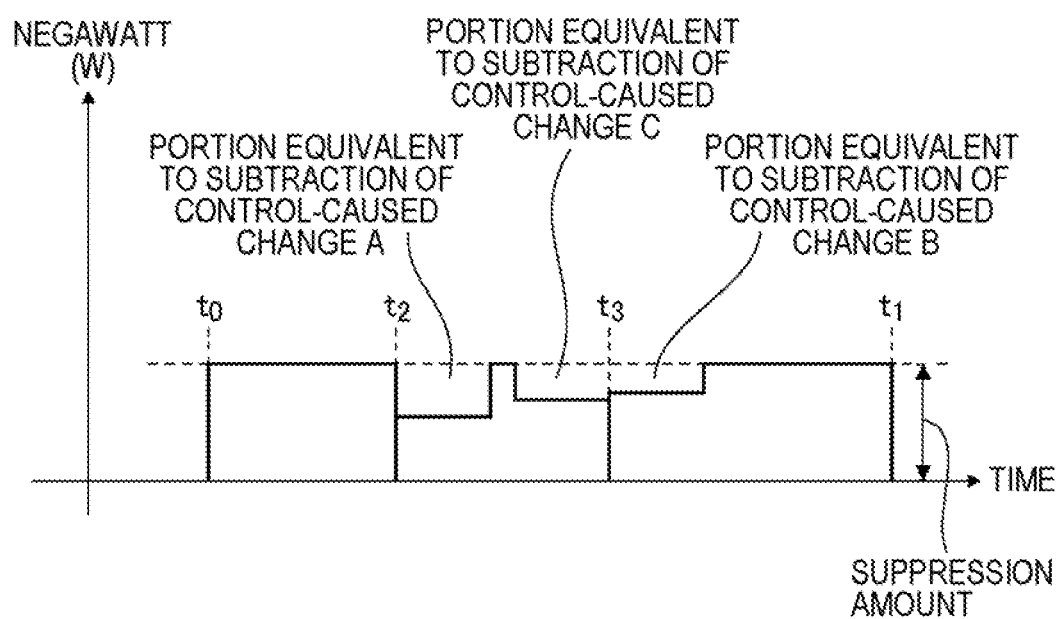
FIG. 11 is a diagram for describing amounts that have become required to be controlled due to control-caused changes.

When no control-caused change is taken into consideration, a suppression amount in the adjustment request can be fulfilled by the control details determined with respect to the consumers A to D. However, when the increases (control-caused changes) in power demand caused by the power demand suppression are subtracted, the suppression amount in the adjustment request becomes unfulfilled during partial time periods, as illustrated in FIG. 11. In the present example embodiment, determining second consumers whose power demands equivalent to portions of the suppression amount having become unfulfilled are to be controlled and control details enables precision in responding to an adjustment request to be increased.

Note that, when a control-caused change the amount of which is equal to or more than a criterion value (for example, an increase the amount of which is equal to or more than a criterion value in power demand or a decrease the amount of which is equal to or more than a criterion value in power demand) is inferred to occur, the determining unit 12 may determine a second consumer whose power demand equivalent to the change is to be controlled and a control amount (individual control amount) by which and a time period (individual control time period) during which the power demand of the second consumer is controlled.

The determining unit 12 can perform determination of a second consumer and determination of an individual control amount and an individual control time period of the second consumer, using a similar method to the method for determination of a first consumer and an individual control amount and an individual control time period of the first consumer. That is, the determining unit 12 can perform the determination of a second consumer and determination of an individual control amount and an individual control time period of the second consumer by performing similar processing with a "control time period" and a "control amount", which are referred to in the determination of a first consumer and an individual control amount and an individual control time period of the first consumer, replaced with a "time period during which the above-described change occurs" and "the amount of change", respectively.

Figure 9:
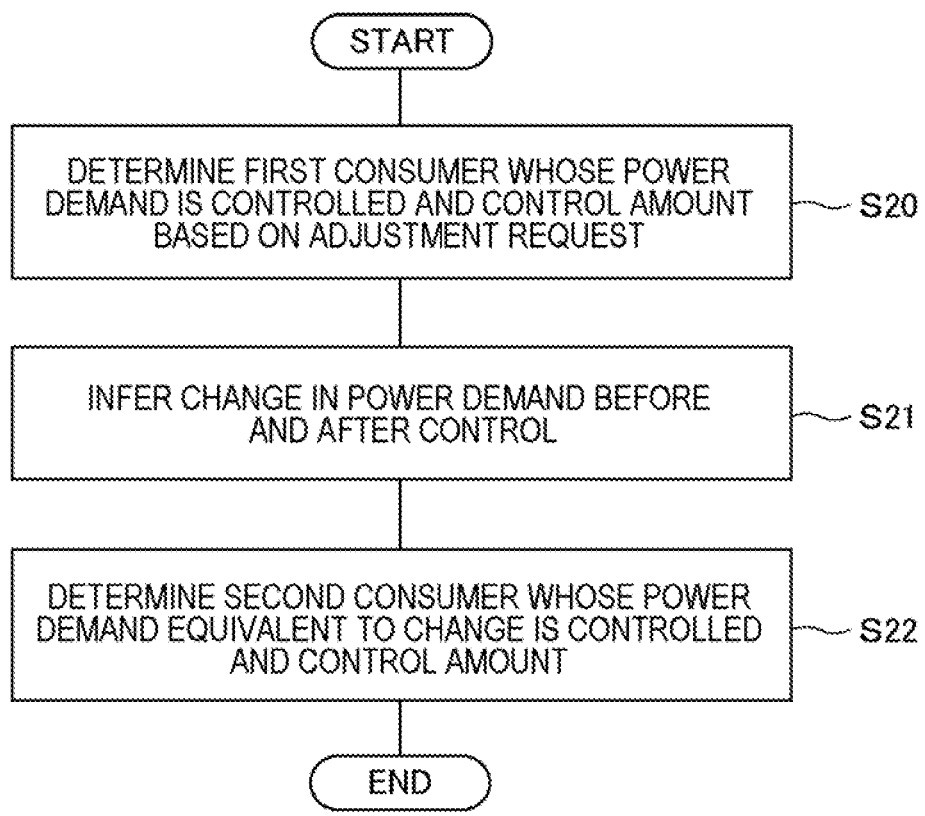
FIG. 9 is a flowchart illustrating an example of a processing flow of a processing apparatus of the present example embodiment.

Next, using a flowchart in FIG. 9, an example of a processing flow of the processing apparatus 10 of the present example embodiment will be described.

In S20, the determining unit 12 determines a first consumer whose power demand is to be controlled and an individual control amount by which and an individual control time period during which the power demand of the first consumer is controlled, based on an "adjustment request in which a control time period during which and a control amount by which power demand is controlled are specified", which was acquired by the acquiring unit 11.

In S21, the inference unit 13 infers whether, when power demand of the first consumer is controlled in accordance with a determination result by the determining unit 12, power demand of the first consumer before and/or after control changes from power demand of the first consumer when the power demand is not controlled.

In S22, when the power demand is inferred to change, such as when the amount of change (change in power [W] and a power amount [Wh]) exceeds a criterion value, the determining unit 12 determines a second consumer whose power demand equivalent to the change is to be controlled and an individual control amount by which and an individual control time period during which the power demand of the second consumer is controlled.

According to the processing apparatus 10 of the present example embodiment that has been described thus far, it is possible to achieve advantageous effects similar to those of the processing apparatus 10 of the first example embodiment.

According to the processing apparatus 10 of the present example embodiment, when a control-caused change occurs in a control time period specified in an adjustment request, it is possible to determine a power consumer who absorbs power demand equivalent to the change (suppresses or promotes the power demand equivalent to the change). Even when consumers (first consumers) whose power demands are to be controlled and control details (individual control amounts and individual control time periods) are determined in such a way as to fulfill an adjustment request, an occurrence of a control-caused change during a control time period makes it difficult to say that the determination completely meets the adjustment request. The processing apparatus 10 of the present example embodiment that is capable of absorbing a control-caused change enables an adjustment request to be completely met. As a result, by requesting a resource aggregator using the processing apparatus 10 to perform supply-demand control, an electricity transmission and distribution utility or the like can perform adjustment of supply-demand balance with good precision.

The processing apparatus 10 of the present example embodiment is also capable of absorbing a control-caused change occurring during a time period other than a control time period specified in an adjustment request. As a result, by requesting a resource aggregator using the processing apparatus 10 to perform supply-demand control, an electricity transmission and distribution utility or the like can perform adjustment of supply-demand balance with good precision.

A variation that is applicable to the first and second example embodiments will be described below. In the determination processing of a first consumer, the determining unit 12 may preferentially determine a consumer who brings about a control-caused change the amount of which (for example, the amount of a control-caused change occurring during a control time period) is small as a first consumer. In the determination processing of a second consumer, the determining unit 12 may also preferentially determine a consumer who brings about a control-caused change the amount of which (for example, the amount of a control-caused change occurring during a control time period) is small as a second consumer. When configured in such a manner, it is possible to suppress an effect of a control-caused change.

Another variation that is applicable to the first and second example embodiments will be described below. The processing apparatus 10 may further include a replying unit that replies an inference result made by the inference unit 13 to the transmission source of an adjustment request (for example, an electricity transmission and distribution utility). A reply to a transmission source may be performed by an electronic mail, performed in a web page provided by a resource aggregator (notification in a login window), or achieved by another means.

The replying unit may transmit an inference result during periods before and after a control time period to the transmission source of the adjustment request. The replying unit may also transmit an inference result during the control time period to the transmission source of the adjustment request. The replying unit may also transmit inference results during periods before and after the control time period and during the control time period to the transmission source of the adjustment request.

In an inference result replied to the transmission source of an adjustment request, temporal change in the amount of a control-caused change (the amount of change (increase or decrease) in power demand from power demand when not controlled) when control is performed based on the adjustment request, an integrated value of the amount of change, or temporal change in power demand when control is performed based on the adjustment request may be indicated.

The variation enables the transmission source of an adjustment request to recognize an effect of the adjustment request. The variation also enables, for example, adjustment of supply-demand balance in a power system to be performed with the effect taken into consideration. As a result, it is possible to perform desired adjustment with high precision.

Hereinafter, examples of reference aspects will be additionally stated.

1. A processing apparatus including:
   an acquiring unit that acquires an adjustment request specifying a control time period during which power demand is controlled and a control amount by which power demand is controlled;
   a determining unit that determines, based on the adjustment request, a first consumer whose power demand is to be controlled, a control amount of the first consumer, and a time period during which power demand of the first consumer is controlled; and
   an inference unit that infers whether, when power demand of the first consumer is controlled in accordance with a determination result made by the determining unit, power demand of the first consumer before and/or after control changes from power demand of the first consumer when the power demand is not controlled.
2. The processing apparatus according to aspect 1, in which
   the inference unit infers whether the change occurs during the control time period.
3. The processing apparatus according to aspect 1 or 2, in which
   the inference unit infers whether a change equal to or more than a criterion value occurs.
4. The processing apparatus according to any one of aspects 1 to 3, in which
   the inference unit infers whether the change occurs, based on a power demand prediction of the first consumer when power demand is controlled and a power demand prediction of the first consumer when power demand is not controlled.
5. The processing apparatus according to aspect 4, in which
   the inference unit infers a power demand prediction of the first consumer when power demand is controlled, based on an actual result when power demand was controlled in a past.
6. The processing apparatus according to any one of aspects 1 to 3, in which
   the determining unit further determines a piece of electric equipment of the first consumer an operation of which is to be controlled in order to control power demand, and
   the inference unit infers whether the change occurs, based on information on a piece of electric equipment an operation of which is to be controlled.
7. The processing apparatus according to any one of aspects 1 to 6, in which
   the determining unit determines, when the change is inferred to occur, a second consumer whose power demand equivalent to a change is to be controlled, a control amount of the second consumer, and a time period during which power demand of the second consumer is controlled.
8. The processing apparatus according to aspect 7, in which
   the determining unit determines, when the change is inferred to occur during the control time period, a second consumer whose power demand equivalent to a change is to be controlled, a control amount of the second consumer, and a time period during which power demand of the second consumer is controlled.
9. The processing apparatus according to aspect 7 or 8, in which
   the determining unit determines, when a change equal to or more than a criterion value is inferred to occur, a second consumer, a control amount of the second consumer, and a time period during which power demand of the second consumer is controlled.
10. The processing apparatus according to any one of aspects 1 to 9 further including
    a replying unit that replies an inference result made by the inference unit to a transmission source of the adjustment request.
11. A processing method executed by a computer, the method including:
    an acquiring step of acquiring an adjustment request specifying a control time period during which power demand is controlled and a control amount by which power demand is controlled;
    a determining step of determining, based on the adjustment request, a first consumer whose power demand is to be controlled, a control amount of the first consumer, and a time period during which power demand of the first consumer is controlled; and
    an inference step of inferring whether, when power demand of the first consumer is controlled in accordance with a determination result made in the determining process, power demand of the first consumer before and/or after control changes from power demand of the first consumer when the power demand is not controlled.
12. A program causing a computer to function as:
    an acquiring unit that acquires an adjustment request specifying a control time period during which power demand is controlled and a control amount by which power demand is controlled;
    a determining unit that determines, based on the adjustment request, a first consumer whose power demand is to be controlled, a control amount of the first consumer, and a time period during which power demand of the first consumer is controlled; and
    an inference unit that infers whether, when power demand of the first consumer is controlled in accordance with a determination result made by the determining unit, power demand of the first consumer before and/or after control changes from power demand of the first consumer when the power demand is not controlled.

This application is based upon and claims the benefit of priority from Japanese Patent Application No. 2018-014834, filed on Jan. 31, 2018, the disclosure of which is incorporated herein in its entirety by reference.

The invention claimed is:
1. A processing apparatus comprising:
   at least one memory configured to store one or more instructions; and
   at least one processor configured to execute the one or more instructions to:
      acquire an adjustment request specifying a control time period during which power demand is controlled and a control amount by which the power demand is controlled;
      infer, based on the adjustment request, a first power demand of a first consumer during a first time period before the control time period when power demand of the first consumer is controlled in accordance with the adjustment request;
      infer, based on the adjustment request, a second power demand of the first consumer during a second time period after the control time period when the power demand is controlled in accordance with the adjustment request;

infer a third power demand of the first consumer during the first time period when the power demand is not controlled;

infer a fourth power demand of the first consumer during the second time period when the power demand is not controlled;

confirm whether the first power demand differs from the third power demand; and confirm whether the second power demand differs from the fourth power demand.

2. The processing apparatus according to claim 1, wherein the processor is further configured to execute the one or more instructions to infer a time when any of the first power demand differs from the third power demand and the second power demand differs from the fourth power demand.

3. The processing apparatus according to claim 1, wherein the processor is further configured to execute the one or more instructions to:

infer whether a difference between the first power demand and the third power demand is equal to or more than a criterion value; and infer whether a difference between the second power demand and the fourth power demand is equal to or more than the criterion value.

4. The processing apparatus according to claim 1, wherein the processor is further configured to execute the one or more instructions to infer whether any of the first power demand differs from the third power demand and the second power demand differs from the fourth power demand based on at least a power demand prediction.

5. The processing apparatus according to claim 1, wherein inferring any of the first power demand, second power demand, third power demand, and fourth power demand is based on one or more actual power demands of the first consumer.

6. The processing apparatus according to claim 1, wherein the processor is further configured to execute the one or more instructions to:

determine a piece of electric equipment of the first consumer in an operation of which is to be controlled in order to control the power demand, and wherein at least one of confirming whether the first power demand differs from the third power demand and whether the second power demand differs from the fourth power demand is based on information on the piece of electric equipment in the operation.

7. The processing apparatus according to claim 1, wherein the processor is further configured to execute the one or more instructions to, when it is confirmed that the first power demand differs from the third power demand and that the second power demand differs from the fourth power demand, determine a second consumer power demand based on at least one of a difference between the first power demand and the third power demand and a difference between the second power demand and a fourth power demand, a second control amount of the second consumer, and a period during which the second consumer power demand of the second consumer is controlled.

8. The processing apparatus according to claim 7, wherein the processor is further configured to execute the one or more instructions to, implement at least one of:

when it is confirmed that the first power demand differs from the third power demand, determine the second consumer power demand based on the difference between the first power demand and the third power demand, the second control amount of the second consumer, and the period during which the second consumer power demand of the second consumer is controlled, and when it is confirmed that the second power demand differs from the fourth power demand, determine the second consumer power demand based on the difference between the second power demand and the fourth power demand, the second control amount of the second consumer, and the period during which the second consumer power demand of the second consumer is controlled.

9. The processing apparatus according to claim 7, wherein the processor is further configured to execute the one or more instructions to, when at least one of the difference between the first power demand and the third power demand and the difference between the second power demand and the fourth power demand is equal to or more than a criterion value, determine the second consumer, the second control amount of the second consumer, and determine the period during which the second consumer power demand of the second consumer is controlled.

10. The processing apparatus according to claim 1, wherein the processor is further configured to execute the one or more instructions to reply a result to a transmission source of the adjustment request, and wherein the result is of any of:
confirming whether the first power demand differs from the third power demand, and
confirming whether the second power demand differs from the fourth power demand.

11. A processing method executed by a computer, the method comprising:

acquiring an adjustment request specifying a control time period during which power demand is controlled and a control amount by which the power demand is controlled;

infer, based on the adjustment request, a first power demand of a first consumer during a first time period before the control time period when the power demand of the first consumer is controlled in accordance with the adjustment request;

infer, based on the adjustment request, a second power demand of the first consumer during a second time period after the control time period when the power demand is controlled in accordance with the adjustment request;

infer a third power demand of the first consumer during the first time period when the power demand is not controlled;

infer a fourth power demand of the first consumer during the second time period when the power demand is not controlled;

confirm whether the first power demand differs from the third power demand; and confirm whether the second power demand differs from the fourth power demand.

12. A non-transitory storage medium storing a program causing a computer to:

acquire an adjustment request specifying a control time period during which power demand is controlled and a control amount by which the power demand is controlled;

infer, based on the adjustment request, a first power demand of a first consumer during a first time period before the control time period when the power demand of the first consumer is controlled in accordance with the adjustment request;

infer, based on the adjustment request, a second power demand of the first consumer during a second time period after the control time period when the power demand is controlled in accordance with the adjustment request;

infer a third power demand of the first consumer during the first time period when the power demand is not controlled;

infer a fourth power demand of the first consumer during the second time period when the power demand is not controlled;

confirm whether the first power demand differs from the third power demand; and confirm whether the second power demand differs from the fourth power demand.

* * * * *